United States Patent Office 2,789,066
Patented Apr. 16, 1957

2,789,066

METHOD FOR HYDROLYZING DEXTRAN

Leo J. Novak, Dayton, Ohio, assignor to The Commonwealth Engineering Company of Ohio, Dayton, Ohio, a corporation of Ohio No Drawing. Application October 14, 1953,
Serial No. 386,131

4 Claims. (Cl. 127—36)

This invention relates to an improved method for the production of relatively low molecular weight dextran from a dextran of relatively high molecular weight. More particularly, the invention relates to an improved method for producing "clinical" dextran from higher molecular weight or "native" dextran.

Dextran suitable for use in intravenous injection fluids for the removal of shock has become known as "clinical" dextran. Specifications have been established for this clinical material by the U. S. military authorities. One of the specifications has to do with the moleclular weight, which must be such that the molecular weight of the 10% portion of lowest molecular weight is not below about 25,000, the molecular weight of the 10% portion of highest molecular weight is not above 200,000, and the average molecular weight is in the range 50,000 to 100,000, preferably between 60,000 and 80,000. Another of the specifications concerns the relative viscosity of the aqueous injection solutions, which should be comparatively high for the given dextran concentration, usually 6% by weight.

In the conventional practice, "clinical" dextran is obtained by partial or controlled depolymerization of "native" dextran, using acid as the hydrolyzing agent.

"Native" dextran may be obtained in several different ways. It may be synthesized by incubating a sucrose-bearing nutrient medium with dextran-producing microorganisms such as those of the *Leuconostoc mesenteroides* and *L. dextranicum* types until maximum dextran production is achieved, in which case the synthesis is effected enzymatically in the presence of bacteria, or it may be obtained by cultivating the microorganism to produce the enzyme dextran sucrose, separating the enzyme by filtration of the culture, introducing the filtrate or the enzyme separated therefrom into aqueous sucrose solution, and holding the mass until the dextran is synthesized from the sucrose, this synthesis being effected in the absence of bacteria, cellular debris, etc. In either procedure, the "native" dextran is precipitated from the fermentate or nutrient medium by the addition of a non-solvent for dextran thereto.

This native material has a very high molecular weight calculated to be in the millions, and cannot be injected, safely. As mentioned previously, the conventional practice involves cleaving the "native" dextran, in acidic solution, to obtain segments of the desired lower average molecular weight.

In accordance with this invention, the acid hydrolysis of the aqueous solution containing "native" dextran is performed by heating an aqueous acid medium containing, in addition to the dextran and water, a limited amount, constant for each batch, of a lower aliphatic, water-miscible alcohol, or of a ketone such as acetone or dioxane, at the boiling point of the water-alcohol or water-ketone mixture until the desired hydrolysis is complete. In the preferred embodiment, the amount of alcohol or ketone present is between 2.5% and 33⅓% by volume of the water, the preferred adjuvant is isopropanol, and the hydrolysis is performed at about 85° C.

In this improved preferred method, wherein the acidic aqueous solution of the "native" dextran containing the isopropanol is heated to about 85° C. and maintained at that temperature for the duration of the hydrolysis reaction, the alcohol appears to exert a retarding or inhibiting effect on the rate at which the hydrolysis proceeds, with very beneficial effects on the viscosity of the aqueous solutions of the clinical dextran separated from the hydrolyzate. The isopropanol evidently functions to inhibit the rate of hydrolysis by decreasing the effectiveness of the hydrolyzing acid through decreased ionization which, consequently, decreases the hydrolysis or cleavage rate. The "native" dextran being hydrolyzed has a high average molecular weight, as noted, but some portions thereof are of higher molecular weight than others. Premature hydrolysis of the portions of highest molecular weight leads to undesirable increased polydispersity of the final hydrolyzed product in aqueous solution. The isopropanol evidently prevents, selectively, and during the early stages of the hydrolysis, premature cleavage of the dextran portions of higher molecular weight and thus favorably influences the viscosity of the aqueous solutions of the final clinical product, which show an improved dextran molecular monodispersity.

It is found that, when the hydrolysis is carried out by heating the acidic solution containing the isopropanol and, initially, the native high average molecular weight dextran to be cleaved, at about 85° C. or the boiling point of the water-isopropanol mixture, until the hydrolysis is complete, usually a matter of minutes, the 6% aqueous solutions of the clinical dextran separated from the hydrolyzate, as by fractional precipitation, have a relative viscosity higher than the viscosity of 6% solutions of hydrolyzed dextran obtained from a similar "native" dextran and which has been hydrolyzed in acidic medium but in the absence of the alcohol. This higher relative viscosity of the aqueous solutions is desirable.

It appears that this increased viscosity of the 6% aqueous solutions of dextran hydrolyzed under the present conditions may be due to the fact that the molecules of the dextran hydrolyzed in the presence of, say, the isopropanol are somewhat less highly branched than dextran hydrolyzed under the conventional conditions. That is, the isopropanol may increase the "de-branching" of the dextran during the acid hydrolysis, resulting in a more linear dextran molecule. That is to say, a higher proportion of the 1:6 molecular structural repeating linkages of the dextran may be cleaved when the hydrolysis is carried out in the presence of the isopropanol. Whatever the explanation may be, the aqueous solutions have higher viscosities than the solutions of equivalent concentrations of dextran hydrolyzed in acidic medium in the absence of the alcohol. For instance, dextran hydrolyzed in aqueous media having an isopropanol concentration of 33⅓% by volume of the water, have a relative viscosity of 5.3 at 25° C., whereas 6% aqueous solutions of similar "native" dextran hydrolyzed in the absence of the isopropanol have a relative viscosity of only 4.3 at 25° C. The higher viscosity of the present solutions is distinctly advantageous from the clinical standpoint.

It is desirable to maintain the temperature of the hydrolysis mass substantially constant at the boiling point of the water-isopropanol mixture. With constant heat input, this is facilitated by a cooling effect resulting from the isopropanol-water vaporization. The hydrolysis may be carried out under reflux, if desired.

When the hydrolysis is performed on a batch basis, the same concentration of alcohol should be present at the beginning of each hydrolysis run so that the product from such batch wil possess the same physical characteristics and yield aqueous solutions of the same viscosity and degree of dextran molecular monodispersity.

While it is preferred to use a mineral acid such as hydrochloric or sulfuric, to initiate the hydrolysis, other acids such as phosphoric acid and organic acids such as acetic acid may be employed. The pH of the aqueous acidic medium may be between about 1.20 and 1.26.

The presence of the alcohol in the aqueous acidic solution also has the effect of lowering the initial viscosity of the solution, which results in improved, more uniform heat transfer throughout the mass.

In carrying out this method, it is desirable to include in the acidic aqueous alcoholic solution of the native dextran, a small amount, such as between 0.3 and 1% of a reducing agent which assists in inhibiting the development of undesirable oxidative solution-darkening reactions during the hydrolysis. Ascorbic acid is a preferred reducing agent.

The hydrolysis time under the optimum conditions described, i. e., heating the aqueous mix containing the isopropanol at about 85° C., is between about 40 and 50 minutes. At the end of this heating period, the hydrolysis having been completed, a caustic solution is added immediately and in the concentration an amount required to adjust the pH of the hydrolyzate to 6.8–7.0. The solution may then be cooled to a temperature in the range of about 35 to 45° C., after which it is decolorized, deionized and clarified. The decoloration is effected by passing the solution through a charcoal bed. The deionization may be effected by passing the decolorized solution through a bed or column containing any efficient anionic and cationic exchange mineral or resin. Further clarification is usually carried out by passing the solution through diatomaceous earth.

The hydrolyzed dextran, in aqueous solution, can be subjected to fractional precipitation, using alcohol or acetone as the precipitant. As is known, by the repeated addition of increasing precipitating amounts of isopropanol, or of acetone, to the aqueous solution of the partial degradation product, dextran fractions of selective average molecular weight can be precipitated and isolated from the hydrolyzate. It is the usual practice to add to the solution, as the first alcohol increment, a sufficient amount of alcohol to selectively precipitate the dextran of highest molecular weight and which is not suitable for use as clinical dextran, separate the precipitate, and then add sufficient alcohol to precipitate the clinical dextran, leaving the lowest molecular weight dextran remaining in solution. This procedure may be followed in isolating the clinical dextran fraction from the hydrolyzed product obtained under the present hydrolzing conditions. The clinical dextran fraction may be dehydrated, using acetone or isopropyl alcohol, and finally dried under vacuum at 50° C. to 80° C.

The following examples are illustrative of the improved hydrolysis method of the invention.

Example I

To an aqueous 10% solution of high molecular weight dextran containing isopropanol in an amount of 7% by volume of the water present there is added sufficient hydrochloric acid to bring the pH of the solution to about 1.04. The native dextran remains in solution at this isopropanol concentration. The solution is then heated slowly to about 85° C. and is maintained at that temperature for about 40–50 minutes, after which the solution is neutralized, cooled, decolorized, deionized and clarified, these treatments being followed by precipitation of the clinical dextran fraction which is recovered, dehydrated, and finally dried under vacuum. A 6% aqueous solution of the clinical dextran obtained in this way has a relative viscosity of about 3.8 at 85° C. and is very suitable for intravenous injection for the removal of shock.

Example II

Example I is repeated except that ethanol is substituted for the isopropanol and the acidified solution is heated to and maintained at 78° C. for 40–50 minutes.

Example III

Example I is repeated except that the isopropanol is used in an amount of 8% by volume of the water present. An aqueous 6% solution of the clinical dextran obtained as final product has a relative viscosity of about 4.0 at 85° C.

Example IV

Example I is repeated except that the isopropanol is used in an amount of 9% by volume of the water present. An aqueous 6% solution of the clinical dextran obtained has a relative viscosity of about 4.3 at 85° C.

Example V

Example I is repeated except that the isopropanol is present in the aqueous acid solution of the native dextran in an amount of 10% by volume of the water present. A 6% aqueous solution of the clinical dextran finally obtained has a relative viscosity of 4.8 at 85° C.

Example VI

Example I is repeated except that the amount of isopropanol in the aqueous acid solution is 20% by volume of the water.

Example VII

Example I is repeated except that ethanol is used and the hydrolysis is performed at about 78° C.

Example VIII

Methanol is substituted in the procedure of Example I, in an amount of 10% by volume of the water, and the hydrolysis is effected at about 65° C., the hydrolysis time being somewhat longer than in Example I, and about 55–60 minutes.

Example IX

Dioxane is substituted for the isopropanol of Example I, and the hydrolysis temperature is elevated to about 100° C., with a somewhat shortened time required to bring about the desired degradation.

Example X

Acetone is used in place of the isopropanol of Example I, the hydrolysis being carried out at about 56° C. for a time period of about 60 minutes.

The alcohol or ketone present during the hydrolysis is, as is known, an agent which precipitates dextran from aqueous solution when used in comparatively large amounts, usually over 35% by volume. In this process, the amount of water-miscible aliphatic alcohol or ketone present during the hydrolysis, from 2.5% to 33⅓% by volume of the water, is usually insufficient to precipitate the dextran from the solution. In any event, the amount of the alcohol or ketone used is controlled within the limits stated so that the dextran to be hydrolyzed remains in solution. At 33⅓% isopropanol, for instance, at the operating temperature of about 85° C., the dextran remains in solution. The preferred amount of alcohol or ketone may be between 2.5 and 10%, or even more desirable, between 7% and 10% by volume of the water. The alcohol or ketone, in these amounts, does not form an azeotropic mixture with the water.

In separating the native or undesirably high molecular weight dextran from a medium in which it is produced by synthesis from sucrose, the precipitation of the dextran may be effected by means of the alcohols or ketones. When this is done, it will generally be preferred to use the same precipitant, but in the non-precipitating amounts, in the hydrolysis of the dextran. However, this is not essential, and the alcohol or ketone present during the hydrolytic cleavage of the dextran may be different from that used to precipitate the native dextran provided that the precipitant for the native product is removed as completely as possible from the native dextran mass before the latter is dissolved in the aqueous acid solution and the alcohol or ketone intended to be present during the hydrolysis is added.

By carrying out the acid hydrolysis of the dextran in the presence of the restricted amounts of alcohol or ketone, at, or approximately at, the boiling point of the water-alcohol or water-keton mixture, there is obtained hydrolyzed dextran which, on fractionation, yields dextran having a molecular weight in the blood plasma extender range and which forms aqueous solutions of a viscosity having a high degree of dextran molecular monodispersity highly suitable for intravenous injection and such that the dextran, in the therapeutic dosage, remains in the system long enough to remove shock.

As indicated, the native or high molecular weight dextran may be obtained in various ways, as generally described herein, by bacterial conversion of the 1, 4 linkages of a dextrin to 1, 6 linkages of dextran, or in any other manner in which a dextran product of average molecular weight higher than clinical dextran and hydrolyzable by acid to produce a blood plasma extender may be obtained.

Some variations or modifications may be made in practicing this invention without departing from the spirit and scope of the details disclosed herein. Any such modifications or variations in details are intended to be included in the scope of the appended claims.

I claim:

1. A method of producing dextran having a molecular weight suitable for intravenous injection as a blood plasma substitute, from a dextran of higher average molecular weight, which comprises heating an aqueous 10% solution of the higher molecular weight dextran containing sufficient sulfuric acid to adjust the pH of the solution to 1.20 to 1.26 and from 2.5% to 33⅓% by volume of the water present of isopropanol at a temperature of about 85° C. until the high molecular weight dextran is hydrolyzed to dextran of a molecular weight in the blood plasma extender range.

2. A method of producing dextran having a molecular weight suitable for intravenous injection as a blood plasma substitute, from a dextran of higher molecular weight, which comprises heating an aqueous 10% solution of the higher molecular weight dextran containing sufficient acid to adjust the pH of the solution to 1.20 to 1.26 and from 2.5% to 33⅓% by volume of the water present, of a non-solvent for the dextran selected from the group consisting of water-miscible aliphatic alcohols and ketones, at the boiling point of the water-non-solvent mixture, until the high molecular weight dextran is hydrolyzed to dextran having a molecular weight in the blood plasma extender range.

3. A method of producing dextran having a molecular weight suitable for intravenous injection as a blood plasma substitute from a dextran of higher average molecular weight, which comprises heating an aqueous 10% solution of the higher molecular weight dextran containing sufficient sulfuric acid to adjust the pH of the solution to 1.20 to 1.26, between 0.3% and 1.0% of ascorbic acid as reducing agent, and from 2.5% to 33⅓% by volume of the water present of isopropanol at a temperature of about 85° C. until the high molecular weight dextran is hydrolyzed to dextran having a molecular weight in the blood plasma extender range.

4. A method of producing dextran having a molecular weight suitable for intravenous injection as a blood plasma substitute from a dextran of higher molecular weight, which comprises heating an aqueous 10% solution of the higher molecular weight dextran containing sufficient acid to adjust the pH of the solution to 1.20 to 1.26, between 0.3% and 1.0% by weight of ascorbic acid as reducing agent, and from 2.5% to 33⅓% by volume of the water present of a non-solvent for the dextran selected from the group consisting of water-miscible aliphatic alcohols and ketones at the boiling point of the water-non-solvent mixture, until the high molecular weight dextran is hydrolyzed to dextran having a molecular weight in the blood plasma substitute range.

References Cited in the file of this patent

UNITED STATES PATENTS

| 2,374,676 | Gardner | May 1, 1945 |
| 2,437,518 | Gronwall | Mar. 9, 1948 |

FOREIGN PATENTS

| 583,378 | Great Britain | Dec. 17, 1946 |

OTHER REFERENCES

Jour. Amer. Pharm. Assn. (Sci. Ed.), April 1949, vol. 38, No. 4, pp. 177–179.